(12) United States Patent
Feng et al.

(10) Patent No.: US 7,751,291 B2
(45) Date of Patent: Jul. 6, 2010

(54) OPTICAL DISC IDENTIFICATION APPARATUS AND METHOD OF IDENTIFYING OPTICAL DISC

(75) Inventors: Wen-Chun Feng, Taipei (TW); Chien-Liang Yeh, Kaohsiung (TW)

(73) Assignee: Sunplus Technology Co., Ltd., Hsinchu (TW)

(*) Notice: Subject to any disclaimer, the term of this patent is extended or adjusted under 35 U.S.C. 154(b) by 478 days.

(21) Appl. No.: 11/870,221

(22) Filed: Oct. 10, 2007

(65) Prior Publication Data

US 2009/0028023 A1    Jan. 29, 2009

(30) Foreign Application Priority Data

Jun. 26, 2007   (TW) .............................. 96123020 A (51) Int. Cl.
*G11B 7/00* (2006.01)
(52) U.S. Cl. .................................................. 369/53.23
(58) Field of Classification Search ........................ None
See application file for complete search history.

(56) References Cited

U.S. PATENT DOCUMENTS

| 5,665,957 | A | * | 9/1997 | Lee et al. ................... 369/53.23 |
| 5,909,419 | A | * | 6/1999 | Kamiyama ................ 369/53.23 |
| 5,917,791 | A | * | 6/1999 | Tsuchiya et al. .......... 369/53.23 |
| 5,986,985 | A |   | 11/1999 | Kawamura et al. |
| 6,278,672 | B1 | * | 8/2001 | Kobayashi ................ 369/53.23 |
| 2002/0041551 | A1 | * | 4/2002 | Konno et al. .............. 369/53.23 |
| 2003/0039189 | A1 |   | 2/2003 | Yang et al. |
| 2004/0240357 | A1 | * | 12/2004 | Takeya ..................... 369/53.22 |
| 2005/0068872 | A1 | * | 3/2005 | Kim et al. .................. 369/53.2 |
| 2005/0068873 | A1 |   | 3/2005 | Chung |

FOREIGN PATENT DOCUMENTS

| TW | 397969 | 7/2000 |
| TW | I227867 | 2/2005 |
| TW | I257605 | 7/2006 |
| TW | I260000 | 8/2006 |

\* cited by examiner

*Primary Examiner*—Peter Vincent Agustín
(74) *Attorney, Agent, or Firm*—J.C. Patents (57) ABSTRACT

An optical disc identification apparatus is disclosed. The optical disc identification apparatus includes an optic pickup unit and a control unit. The optic pickup unit has a plurality of laser sources. The optic pickup unit emits any of lasers to the optical disc and detects the reflected laser from the optical disc to transduce the reflected laser to a detection signal. The control unit controls the optic pickup unit to activate any of the laser sources and moves an object lens of the optic pickup unit. When the object lens moves, the control unit obtains a sectional width value of an S-curve of a focus FE signal according to the detection signal. The control unit repeats above steps to obtain the sectional width values of the S-curves of all the laser sources and identifies the optical disc according to all the sectional width values.

27 Claims, 10 Drawing Sheets

OPTICAL DISC IDENTIFICATION APPARATUS AND METHOD OF IDENTIFYING OPTICAL DISC

CROSS-REFERENCE TO RELATED APPLICATION

This application claims the priority benefit of Taiwan application serial no. 96123020, filed on Jun. 26, 2007. All disclosure of the Taiwan application is incorporated herein by reference.

BACKGROUND OF THE INVENTION

1. Field of the Invention

The present invention relates to an optical disc identification apparatus and a method of identifying an optical disc. More particularly, the present invention relates to an apparatus of identifying an optical disc with use of a sectional width value of an S-curve of a focus error (FE) signal and a method thereof.

2. Description of Related Art

As disc storage technology advances, more types of discs are available, and data storage capacity of the discs is increasing as well. However, given that an apparatus for reading the data in the discs is not compatible with various kinds of the discs, the user inevitably has to purchase different disc readers, leading to unnecessary costs and superfluous consumption of resources on earth. Hence, a great number of the disc readers are equipped with an optical disc identification apparatus, such that the discs in various kinds can be read merely by a single disc reader.

Figure 1:
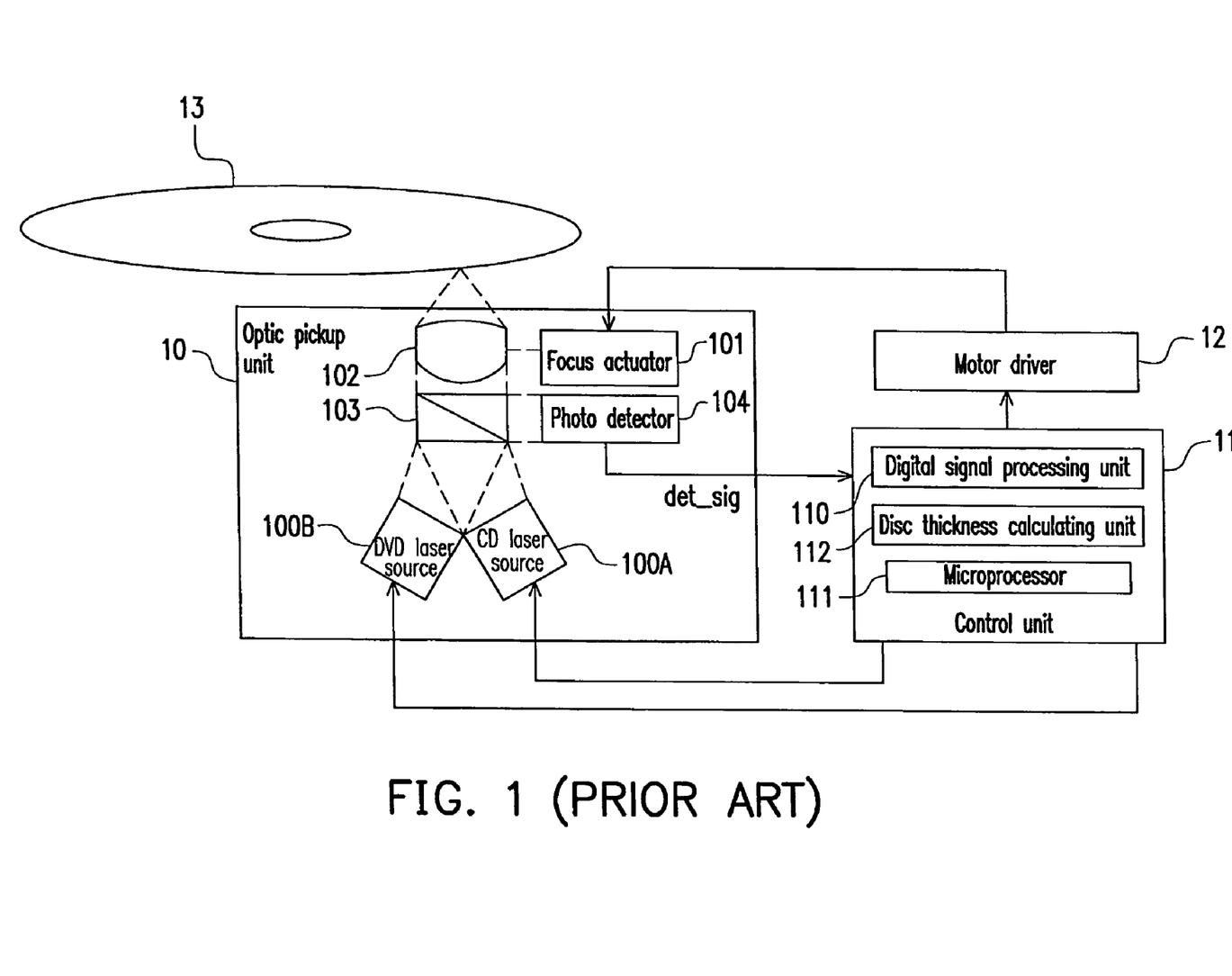
FIG. 1 illustrates an embodiment of a conventional optical disc identification apparatus.
Figure 2:
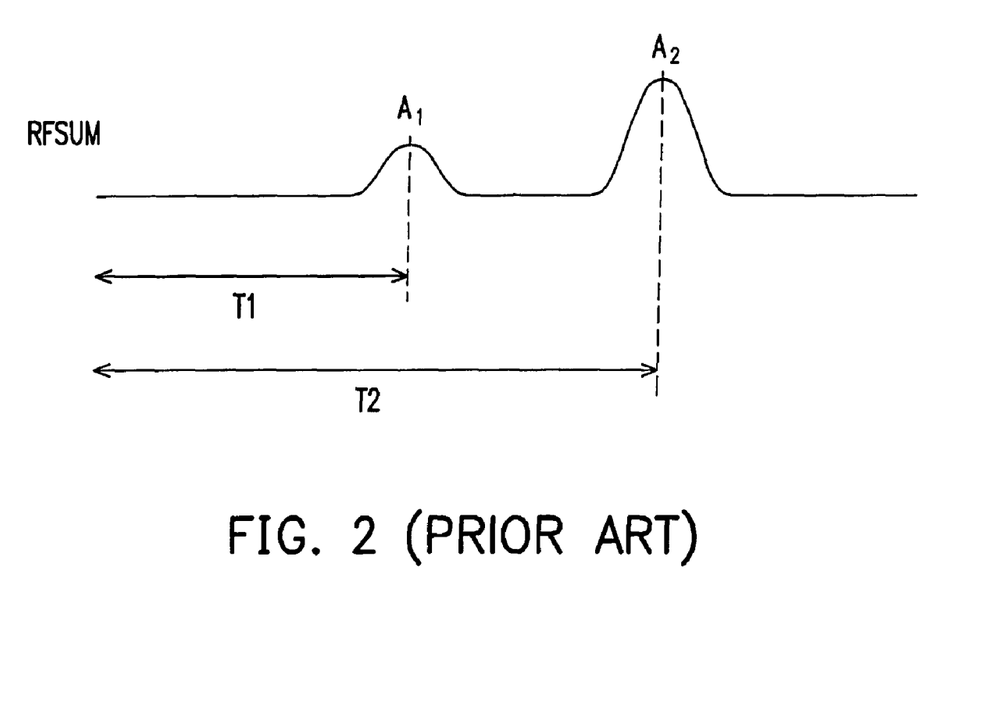
FIG. 2 depicts a waveform of a RFSUM signal adopted in a conventional optical disc identification apparatus.

Conventionally, in an apparatus of identifying an optical disc and a method thereof, the optical disc is identified based on a thickness of the disc. Please refer to FIGS. 1 and 2. FIG. 1 illustrates an embodiment of a conventional optical disc identification apparatus. FIG. 2 depicts a waveform of a RFSUM signal adopted in a conventional optical disc identification apparatus. The conventional optical disc identification apparatus includes an optic pickup unit 10, a control unit 11 and a motor driver 12. The control unit 11 is coupled to the optic pickup unit 10 and the motor driver 12 which is coupled to the optic pickup unit 10. The optic pickup unit 10 has a plurality of laser sources for emitting any of lasers to an optical disc 13 and detecting the laser reflected by the optical disc 13 to transduce the reflected laser to a detection signal det_sig. The control unit 11 controls the optic pickup unit 10 to activate any of the laser sources. In addition, under the control of the control unit 11, the motor driver 12 drives the optic pickup unit 10, so as to move an object lens 102 of the optic pickup unit 10. As the optic pickup unit 10 moves, the control unit 11 calculates the RFSUM signal based on the detection signal det_sig. Here, a peak value A1 of the RFSUM signal is generated by the laser reflected by a superficial layer of the optical disc 13, while a peak value A2 of the RFSUM signal is obtained by the laser reflected from a data layer of the optical disc 13. The control unit 11 calculates a time difference T2-T1 (referring to FIG. 2) between the peak values A1 and A2 and estimates a thickness of the optical disc 13 based on the time difference T2-T1, so as to identify the optical disc 13.

Please refer to FIGS. 1 and 2 again. The optic pickup unit 10 includes a compact disc (CD) laser source 100A, a digital video disc (DVD) laser source 100B, a focus actuator 101, the object lens 102, a beam splitter 103, and a photo detector 104. The control unit 11 includes a digital signal processing unit 110, a microprocessor 111 and a disc thickness calculating unit 112. Here, the focus actuator 101 is coupled to the motor driver 12. The CD laser source 100A and the DVD laser source 100B are controlled by the control unit 11. As the CD laser source 100A (or the DVD laser source 100B) is activated by the control unit 11, the activated CD laser source 100A (or the activated DVD laser source 100B) emits a CD laser (or a DVD laser). The focus actuator 101 receives a focus driving voltage signal of the motor driver 12, so as to achieve a uniform movement of the object lens 102. When the object lens 102 moves, the CD laser (or the DVD laser) emitted by the CD laser source 100A (or the DVD laser source 100B) is focused on the superficial layer and the data layer of the optical disc 13. The object lens 102 collects the emitted laser from the CD laser source 100A (or the DVD laser source 100B) and the CD laser (or the DVD laser) reflected by the optical disc 13. The beam splitter 103 separates the CD laser (or the DVD laser) emitted by the CD laser source 100A (or the DVD laser source 100B) from the CD laser (or the DVD laser) reflected by the optical disc 13. Additionally, the beam splitter 103 transmits the CD laser (or the DVD laser) emitted by the CD laser source 100A (or the DVD laser source 100B) to the object lens 102 and transmits the CD laser (or the DVD laser) reflected by the optical disc 13 to the photo detector 104. The photo detector 104 detects the CD laser (or the DVD laser) reflected from the optical disc 13 and transduces the same to the detection signal det_sig. The digital signal processing unit 110 calculates the RFSUM signal based on the detection signal det_sig. The disc thickness calculating unit 112 calculates the time difference T2-T1 of the peak values A1 and A2 of the RFSUM signal and estimates the thickness of the optical disc 13 based on the time difference T2-T1, so as to identify the optical disc 13. The microprocessor 111 controls the optic pickup unit 10 to activate the laser source 100A or 100B.

The conventional optical disc identification apparatus is apt to be affected by variance of the optical disc 13 or by fabrications of the motor driver 101 and the focus actuator 12 under different variables, leading to errors of the time difference T2-T1. As the errors of the time difference T2-T1 occur, the result of identifying the optical disc 13 may be wrong. Moreover, the superficial layer of the optical disc 13 has a relatively low reflectivity, such that the optic pickup unit 10 may not be able to identify a position of the superficial layer of the optical disc 13.

To rectify the drawback of the conventional apparatus and method of identifying the optical disc by the thickness thereof, a Taiwanese patent numbered I257605 provides an apparatus of discriminating the optical disc and a method thereof by characteristics of wavelengths. The operating principles of the apparatus and the method lie in that the laser sources with different wavelengths may result in dissimilar reflectivity of the discs having pits in different depths, and thereby the optical discs can be identified. Nevertheless, according to the method, the lasers emitted by the laser sources have to be focused on the optical discs for identifying the same, which may bring about excessive processing time consumed on reading the optical discs.

Taiwanese patent numbered 397969 discloses another apparatus and method of identifying an optical disc by a thickness thereof. However, inconsistent optical deviation angles may lead to inaccurate identification of the optical disc. In addition, Taiwanese patent numbered I227867 teaches still another apparatus and method of identifying an optical disc with use of a specific pickup head. Since the specified pickup head has to be employed in said invention, and an influence of noises may be easily imposed thereon, it is likely to mistakenly discriminate the optical disc. Further, Taiwanese patent numbered I260000 provides yet still another apparatus and method of identifying an optical disc based on reflectivity of the optical disc and a thickness thereof. In this method, the drawbacks of identifying the optical disc according to reflectivity of the optical disc and the thickness thereof still exist, for the optical disc may be wrongly identified due to variance of the optical disc.

In U.S. publication numbered 20050068873, an apparatus of discriminating an optical disc depending upon different thicknesses of the optical disc and a method therefor are provided. By comparing peak-to-peak values generated by different lasers, the optical disc can be identified. Nevertheless, with insensitive reflectivity arisen from variance of the optical disc, the optical disc is apt to be erroneously identified.

In U.S. Pat. No. 5,986,985, an apparatus of discriminating an optical disc depending upon reflectivity of the optical disc and a method therefor are provided. According to the invention, peak values of FE signals generated by different lasers are compared with predetermined threshold values, so as to identify the optical disc. Alternatively, a ratio of the peak values generated by the different lasers can also be compared to identify the optical disc. Unfortunately, due to insensitive reflectivity arisen from variance of the optical disc, it is also likely to inaccurately identify the optical disc according to the invention.

In U.S. publication numbered 20030039189, an apparatus of identifying an optical disc depending upon different reflectivity of the optical disc and a method therefor are further provided. According to the present invention, the optical disc is discriminated merely by comparing a peak value of an FE signal generated by a CD laser with a predetermined reference value. However, due to insensitive reflectivity arisen from variance of the optical disc, it is even more likely to inaccurately identify the optical disc according to the invention.

Based on the above, in the conventional apparatus and method of identifying the optical disc, the optical disc can be either discriminated by its thickness or identified because it is reflectivity-sensitive to specific light wavelengths. However, by applying the aforesaid method, the optical disc may be erroneously identified due to different reflectivity of the optical disc or the fabrications of the motor driver and the focus actuator under different variables.

Thus, a number of manufacturers of the optical disc identification apparatuses endeavor to overcome said issues.

SUMMARY OF THE INVENTION

The present invention is directed to an optical disc identification apparatus and a method of identifying an optical disc by detecting variance of optical signals. Namely, the optical disc is identified by means of a sectional width value of an S-curve of an FE signal.

The present invention provides an optical disc identification apparatus including an optic pickup unit and a control unit. The control unit is coupled to the optic pickup unit. The optic pickup unit is equipped with a plurality of laser sources for emitting any of lasers to the optical disc. Besides, the optic pickup unit detects the laser reflected by the optical disc and transduces the reflected laser to a detection signal. The control unit controls the optic pickup unit to activate any of the lasers and moves an object lens of the optic pickup unit. When the object lens moves, the control unit calculates an FE signal according to the detection signal and thereby obtains a sectional width value of an S-curve of the FE signal. The control unit then repeats above steps to obtain the sectional width values of the S-curves of all of the laser sources. Thereafter, the control unit compares all the sectional width values, so as to identify the optical disc.

According to an embodiment of the present invention, the control unit identifies the optical disc according to the laser source corresponding to a smallest sectional width value of the S-curve of the FE signal. Additionally, the sectional width value of the S-curve includes one of the sectional width values, a plurality of the sectional width values, half of the sectional width value, a quarter of the sectional width value, a width value of the positive half of the S-curve, a width value of the negative half of the S-curve, a width value from peak to valley of the S-curve, and a combination thereof.

According to an embodiment of the present invention, the control unit further includes a comparing unit of the sectional width value of the S-curve. The comparing unit of the sectional width value of the S-curve records and compares the sectional width values of the S-curves, so as to identify the optical disc.

The present invention further provides a method of identifying an optical disc. The method is adapted to an apparatus equipped with an optic pickup unit having an object lens and a plurality of laser sources. The method includes the following steps: (a) activating any of laser sources to emit any of lasers to the optical disc; (b) moving the object lens; (c) detecting the laser reflected by a data layer of the optical disc; (d) calculating an FE signal based on the reflected laser and thereby obtaining a sectional width value of an S-curve of the FE signal; (e) repeating above steps to obtain the sectional width values of the S-curves corresponding to all of the laser sources; and (f) comparing the sectional width values, so as to identify the optical disc.

According to an embodiment of the present invention, the optical disc is identified according to the laser source corresponding to a smallest sectional width value of the S-curve. Besides, the sectional width value of the S-curve includes one of the sectional width values, a plurality of the sectional width values, half of the sectional width value, a quarter of the sectional width value, a width value of the positive half, a width value of the negative half, a width value from peak to valley, and a combination thereof.

The present invention further provides an optical disc identification apparatus including an optic pickup unit, a control unit and a comparing unit of a sectional width value of an S-curve. The optic pickup unit has a first laser source and a second laser source for emitting a first laser and a second laser, respectively. The control unit is coupled to the optic pickup unit for controlling the optic pickup unit to activate the first and the second laser sources. The comparing unit of the sectional width value of the S-curve is disposed in the control unit for recording and comparing the sectional width values of the S-curves of a first and a second FE signals generated by focusing the first and the second lasers on the optical disc.

According to an embodiment of the present invention, when the sectional width value of the S-curve of the first FE signal is less than that of the second FE signal, the comparing unit of the sectional width value of the S-curve categorizes the optical disc as a type of the optical disc employing the first laser. On the other hand, when the sectional width value of the S-curve of the first FE signal exceeds that of the second FE signal, the comparing unit of the sectional width value of the S-curve categorizes the optical disc as a type of the optical disc employing the second laser. Besides, the sectional width value of the S-curve includes one of the sectional width values, a plurality of the sectional width values, half of the sectional width value, a quarter of the sectional width value, a width value of the positive half, a width value of the negative half, a width value from peak to valley, and a combination thereof.

According to the optical disc identification apparatus and the method of identifying the optical disc in the present invention, the optical disc is identified by means of the sectional width value of the S-curve of the FE signal. Therefore, unlike the conventional apparatus and method, the apparatus and the method disclosed in the present invention are neither affected by different reflectivity of the optical disc nor influenced by the fabrications of the motor driver and the focus actuator under different variables. As such, the optical disc is not erroneously identified. Based on the above, the apparatus and the method proposed by the present invention can be adopted to accurately identify the optical discs having substrates in various thicknesses.

In order to make the above and other objects, features and advantages of the present invention more comprehensible, several embodiments accompanied with figures are described in detail below.

DESCRIPTION OF EMBODIMENTS

Figure 3:
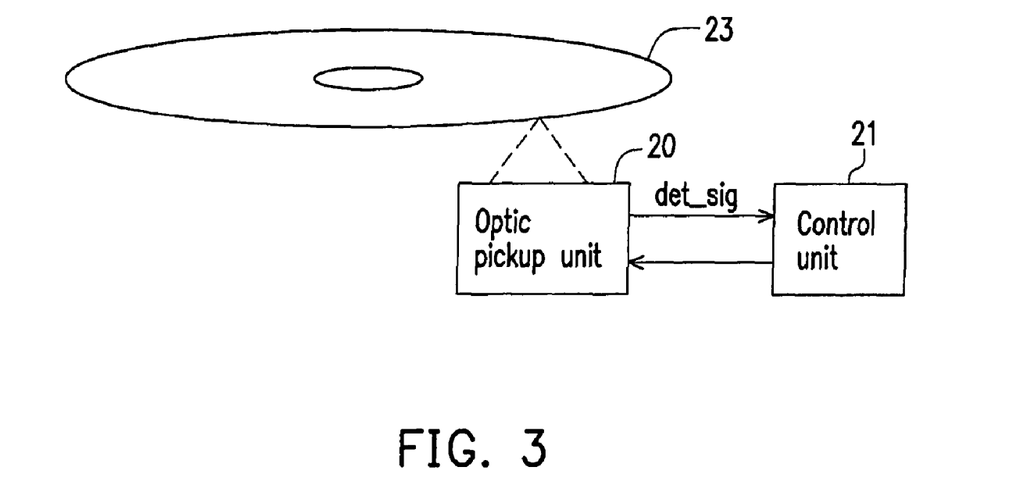
FIG. 3 illustrates an optical disc identification apparatus according to an embodiment of the present invention.

FIG. 3 illustrates an optical disc identification apparatus according to an embodiment of the present invention. The optical disc identification apparatus includes an optic pickup unit 20 and a control unit 21. The control unit 21 is coupled to the optic pickup unit 20. The optic pickup unit 20 has an object lens and a plurality of laser sources, each of which is capable of emitting a laser to an optical disc 23, respectively. Besides, the optic pickup unit 20 detects the laser reflected by the optical disc 23 to transduce the reflected laser to a detection signal det_sig. The control unit 21 controls the optic pickup unit 20 to activate any of the lasers and moves the object lens of the optic pickup unit 20. When the object lens moves, the control unit 21 calculates an FE signal according to the detection signal det_sig and thereby obtains a sectional width value of an S-curve of the FE signal. The control unit 21 then repeats above steps to obtain the sectional width values of the S-curves of the FE signals generated by all of the laser sources. Thereafter, the control unit 21 compares all the sectional width values, so as to identify the optical disc 23.

An operating principle of the aforesaid method for identifying the optical disc is provided hereinafter. As each of the lasers respectively emitted by the plurality of the laser sources is focused on the optical disc 23, the S-curves of the different FE signals are then generated. Suppose that the laser is not the correct laser corresponding to the optical disc 23, the S-curves of the FE signals are then widened due to spherical aberration. Accordingly, there is likelihood of determining the laser source which generates the least spherical aberration by comparing the sectional width values of the S-curves of the FE signals generated by the different laser sources, and thereby the optical disc can be identified. In view of the above, the control unit 21 identifies the optical disc 23 by detecting the laser source corresponding to the smallest sectional width value of the S-curve of the FE signal. In other words, the laser source corresponding to the smallest sectional width value of the S-curve of the FE signal is referred to as the laser source corresponding to the optical disc 23.

Figure 4:
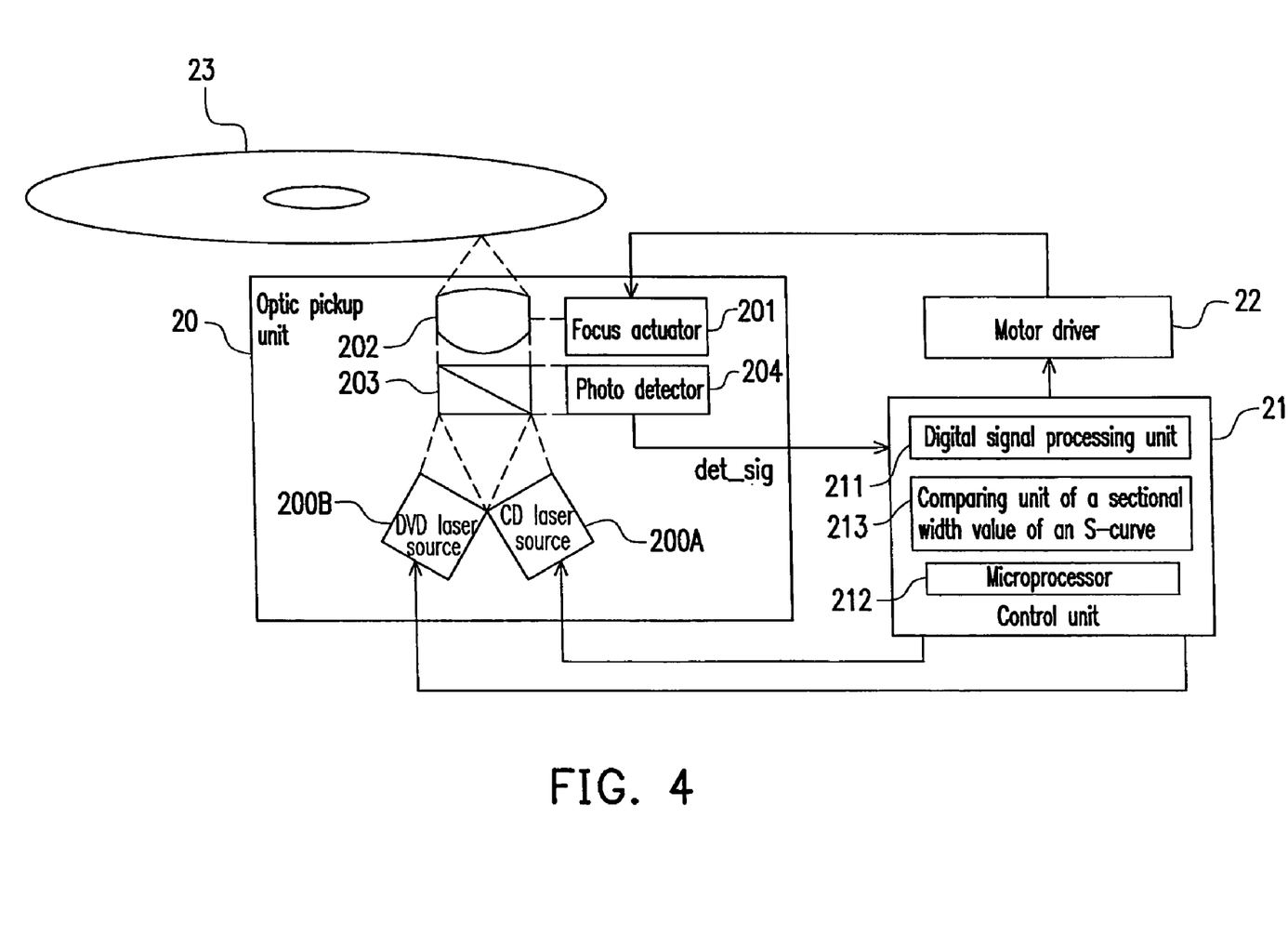
FIG. 4 is a detailed circuit diagram of FIG. 3.

Please refer to FIG. 4 which is a detailed circuit diagram of FIG. 3. As illustrated in FIG. 4, the optical disc identification apparatus further includes a motor driver 22 for providing a focus driving voltage signal FCO. The optic pickup unit 20 includes a CD laser source 200A, a DVD laser source 200B, an object lens 202, a beam splitter 203, a photo detector 204, and a focus actuator 201. The CD laser source 200A and the DVD laser source 200B are controlled by the control unit 21 for emitting a CD laser and a DVD laser, respectively. The laser emitted by the CD laser source 200A is 780 nm, whereas the laser emitted by the DVD laser source 200B is 650 nm. The focus actuator 201 is controlled by the focus driving voltage signal FCO for moving the object lens 202. The lasers emitted by the laser sources 200A and 200B are focused on a data layer of the optical disc 23 through the object lens 202, and the lasers reflected by the data layer of the optical disc 23 are then projected to the photo detector 204 through the object lens 202. The beam splitter 203 separates the lasers emitted by the laser sources 200A and 200B from the lasers reflected by the data layer of the optical disc 23. The lasers emitted by the CD laser source 200A and the DVD laser source 200B are then transmitted to the object lens 202 through the beam splitter 203, while the lasers reflected by the data layer of the optical disc 23 are sent to the photo detector 204 through the beam splitter 203. The photo detector 204 receives the lasers reflected by the data layer of the optical disc 23 and transduces the reflected lasers to the detection signals det_sig.

The control unit 21 includes a digital signal processing unit 211, a microprocessor 212 and a comparing unit 213 of the sectional width value of the S-curve. The digital signal processing unit 211 calculates the FE signal based on the detection signal det_sig, so as to obtain the S-curve of the FE signal. The comparing unit 213 of the sectional width value of the S-curve is coupled to the digital signal processing unit 211 and is used for recording the sectional width value of the S-curve and comparing the sectional width values of the S-curves of the FE signals generated by all of the the laser sources, so as to identify the optical disc 23. The microprocessor 212 is coupled to the comparing unit 213 of the sectional width value of the S-curve for controlling a movement of the object lens 202 and for controlling the optic pickup unit 20 to activate the CD laser source 200A and the DVD laser source 200B. In addition, the microprocessor 212 also controls the comparing unit 213 of the sectional width value of the S-curve to compare the stored sectional width values of the S-curves.

Figure 5:
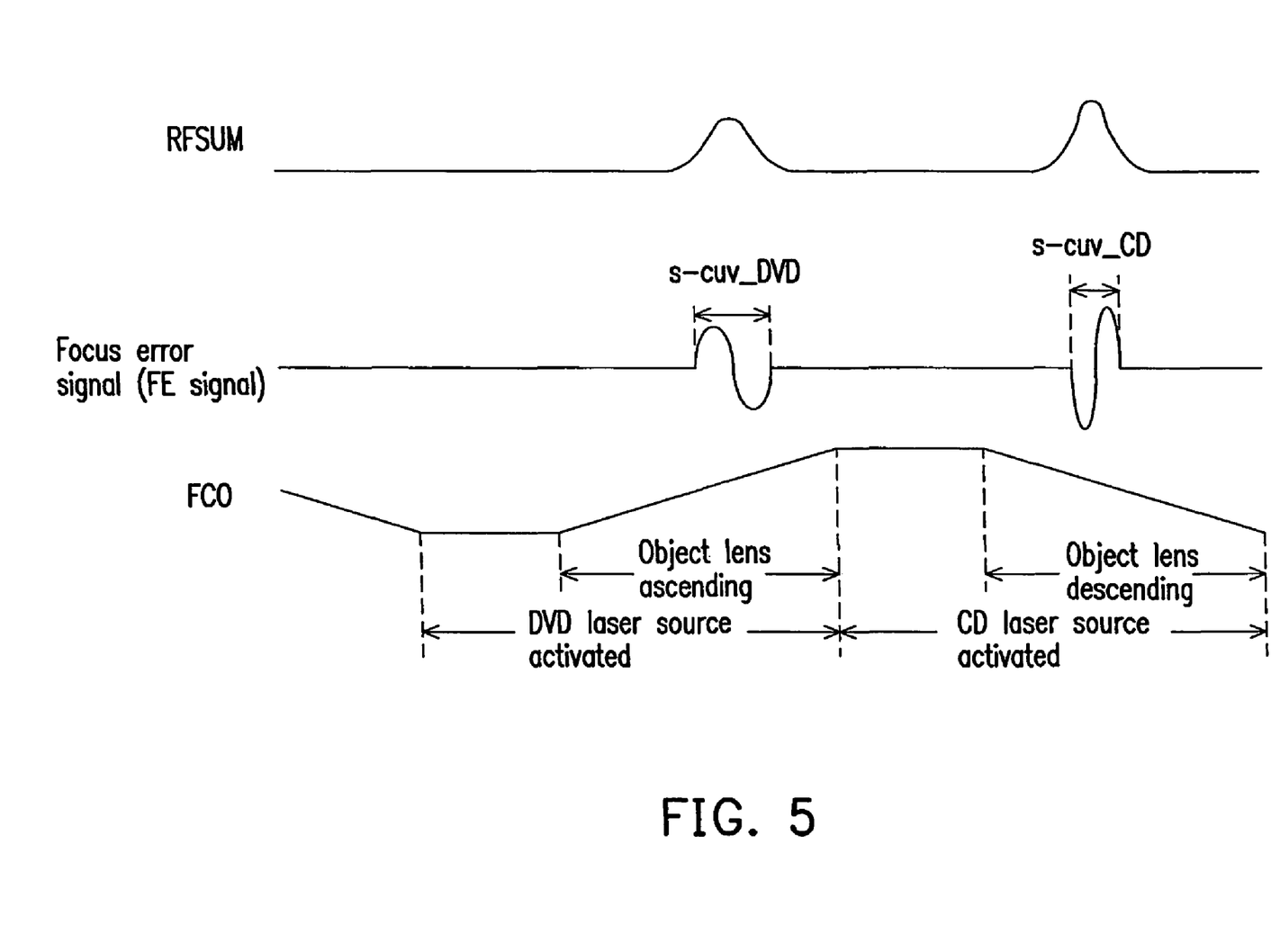
FIG. 5 is a schematic view illustrating an S-curve of an FE signal according to the embodiment depicted in FIG. 4.

FIG. 5 is a schematic view illustrating the S-curve of the FE signal according to the embodiment depicted in FIG. 4. As depicted in FIG. 5, when the DVD laser source 200B is activated, the motor driver 22 is controlled by the control unit 21, such that a voltage of the focus driving voltage signal FCO is raised in a constant slope. Here, the focus actuator 201 controlled by the focus driving voltage signal FCO moves the object lens 202. When the object lens 202 ascends, the DVD laser is focused on the data layer of the optical disc 23, and the S-curve of the FE signal is further generated. Next, the comparing unit 213 of the sectional width value of the S-curve records the sectional width value of the S-curve generated by the DVD laser source 200B as S-cuv_DVD. Thereafter, when the CD laser source 200A is activated, the motor driver 22 is controlled by the control unit 21, such that the voltage of the focus driving voltage signal FCO is decreased in a constant slope. Here, the focus actuator 201 controlled by the focus driving voltage signal FCO moves the object lens 202. When the object lens 202 descends, the CD laser is focused on the data layer of the optical disc 23, and another S-curve of the FE signal is then formed. Next, the comparing unit 213 of the sectional width value of the S-curve records the sectional width value of the S-curve generated by the CD laser source 200A as S-cuv_CD. Afterwards, the microprocessor 212 controls the comparing unit 213 of the sectional width value of the S-curve to compare the sectional width values S-cuv_CD and S-cuv_DVD respectively generated by the CD laser source 200A and the DVD laser source 200B, such that the optical disc 23 can be identified based on the laser source corresponding to the smallest sectional width value of the S-curve. The above order of activating the CD laser source 200A and the DVD laser source 200B are exemplary and hence by no means limits the scope of the present invention.

The motor driver 22 of the optical disc identification apparatus as illustrated in FIG. 4 is removable. Instead, the control unit 21 may be directly adopted to control the focus actuator 201. On the other hand, it is not necessary to employ the focus actuator 201 to move the object lens 202, while the optical disc identification apparatus shown in FIG. 4 is embodied by utilizing said focus actuator 201 for moving the object lens 202. Since said embodiment is not intended to limit the present invention, various embodiments in a manner consistent with the scope of the invention may be construed as set forth in the following claims. Moreover, although only one sectional width value of the S-curve is illustrated in FIG. 5, the sectional width value of the S-curve may further include one of the sectional width values, a plurality of the sectional width values, half of the sectional width value, a quarter of the sectional width value, a width value of the positive half of the S-curve, a width value of the negative half of the S-curve, a width value from peak to valley of the S-curve, and a combination thereof. In other words, the sectional width value of the S-curve includes the sectional width value in any period of time during which the S-curve starts and ends.

Figure 6:
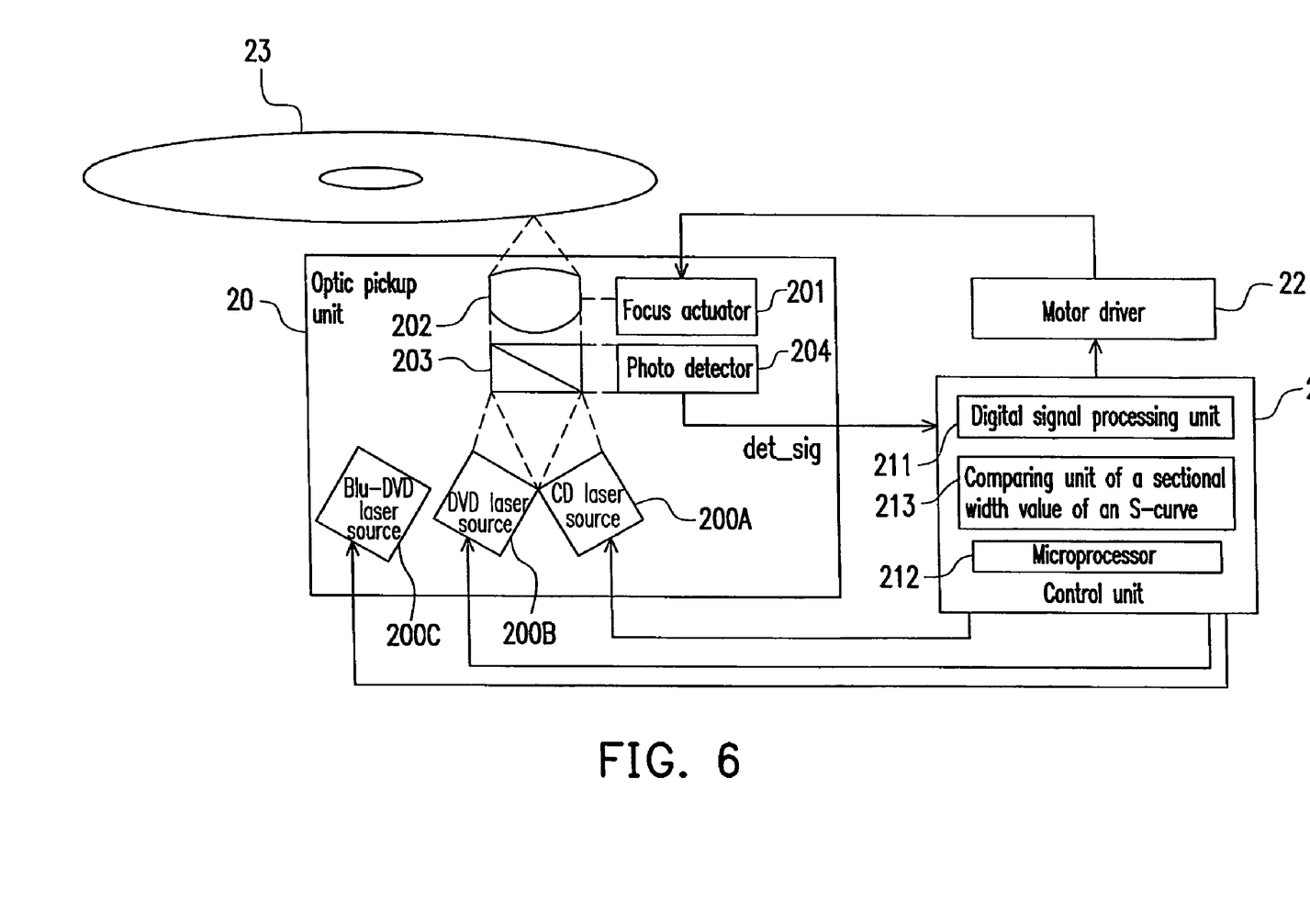
FIG. 6 is another detailed circuit diagram of FIG. 3.
Figure 7:
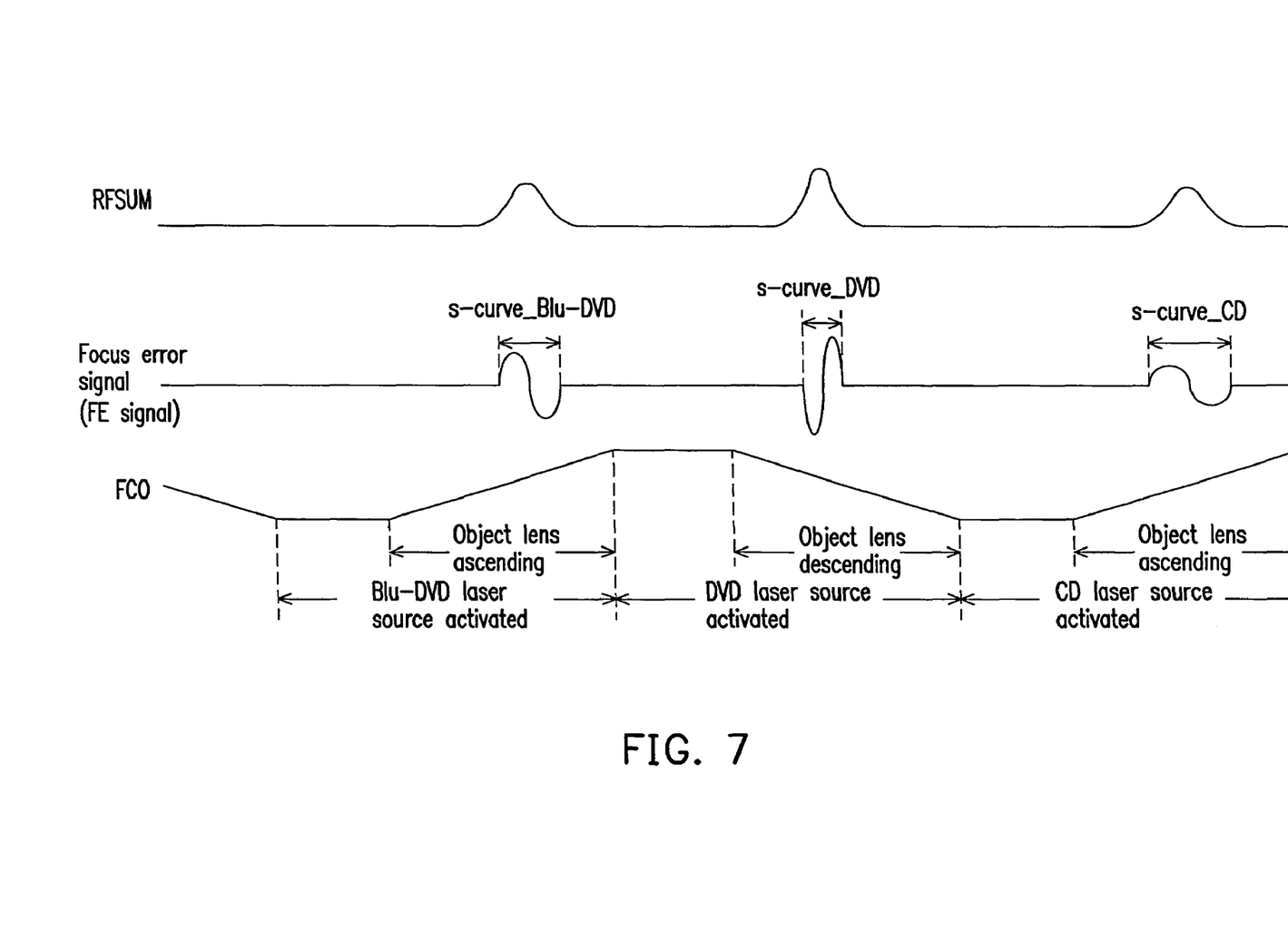
FIG. 7 is a schematic view illustrating an S-curve of an FE signal according to the embodiment depicted in FIG. 6.

Referring to FIG. 6, according to another embodiment of the present invention, the optic pickup unit 20 further includes a Blu-DVD laser source 200C. The Blu-DVD laser source 200C is controlled by the control unit 21 and is capable of emitting a Blu-DVD laser having a wavelength at 405 nm. Please refer to FIG. 7 which schematically illustrates the S-curve of the FE signal according to the embodiment depicted in FIG. 6. As depicted in FIG. 7, when the Blu-DVD laser source 200C is activated, the motor driver 22 is controlled by the control unit 21, such that the voltage of the focus driving voltage signal FCO is raised in a constant slope. Here, the focus actuator 201 controlled by the focus driving voltage signal FCO moves the object lens 202. When the object lens 202 ascends, the Blu-DVD laser emitted by the Blu-DVD laser source 200C is focused on the data layer of the optical disc 23 through the object lens 202, and the S-curve of the FE signal is then formed. Next, the comparing unit 213 of the sectional width value of the S-curve records the sectional width value of the S-curve generated by the Blu-DVD laser source 200C as S-cuv_Blu-DVD. Thereafter, when the DVD laser source 200B is activated, the motor driver 22 is controlled by the control unit 21, such that the voltage of the focus driving voltage signal FCO is decreased in a constant slope. Here, the focus actuator 201 controlled by the focus driving voltage signal FCO moves the object lens 202. When the object lens 202 descends, the DVD laser emitted by the DVD laser source 200B is focused on the data layer of the optical disc 23 through the object lens 202, and the S-curve of the FE signal is then formed. Next, the comparing unit 213 of the sectional width value of the S-curve records the sectional width value of the S-curve generated by the DVD laser source 200B as S-cuv_DVD. Thereafter, when the CD laser source 200A is activated, the motor driver 22 is controlled by the control unit 21, such that the voltage of the focus driving voltage signal FCO is increased in a constant slope. Here, the focus actuator 201 controlled by the focus driving voltage signal FCO moves the object lens 202. When the object lens 202 ascends, the CD laser emitted by the CD laser source 200A is focused on the data layer of the optical disc 23 through the object lens 202, and the S-curve of the FE signal is then formed. Next, the comparing unit 213 of the sectional width value of the S-curve records the sectional width value of the S-curve generated by the CD laser source 200A as S-cuv_CD. Afterwards, the microprocessor 212 controls the comparing unit 213 of the sectional width value of the S-curve to compare the sectional width values S-cuv_Blu-DVD, S-cuv_DVD and S-cuv_CD respectively generated by the Blu-DVD laser source 200C, the DVD laser source 200B and the CD laser source 200A, such that the optical disc 23 can be identified. As described hereinbefore, the optical disc 23 is identified based on the laser source corresponding to the smallest sectional width value of the S-curve. The above order of activating the Blu-DVD laser source 200C, the DVD laser source 200B and the CD laser source 200A are exemplary and hence by no means limits the scope of the present invention.

Figure 8:
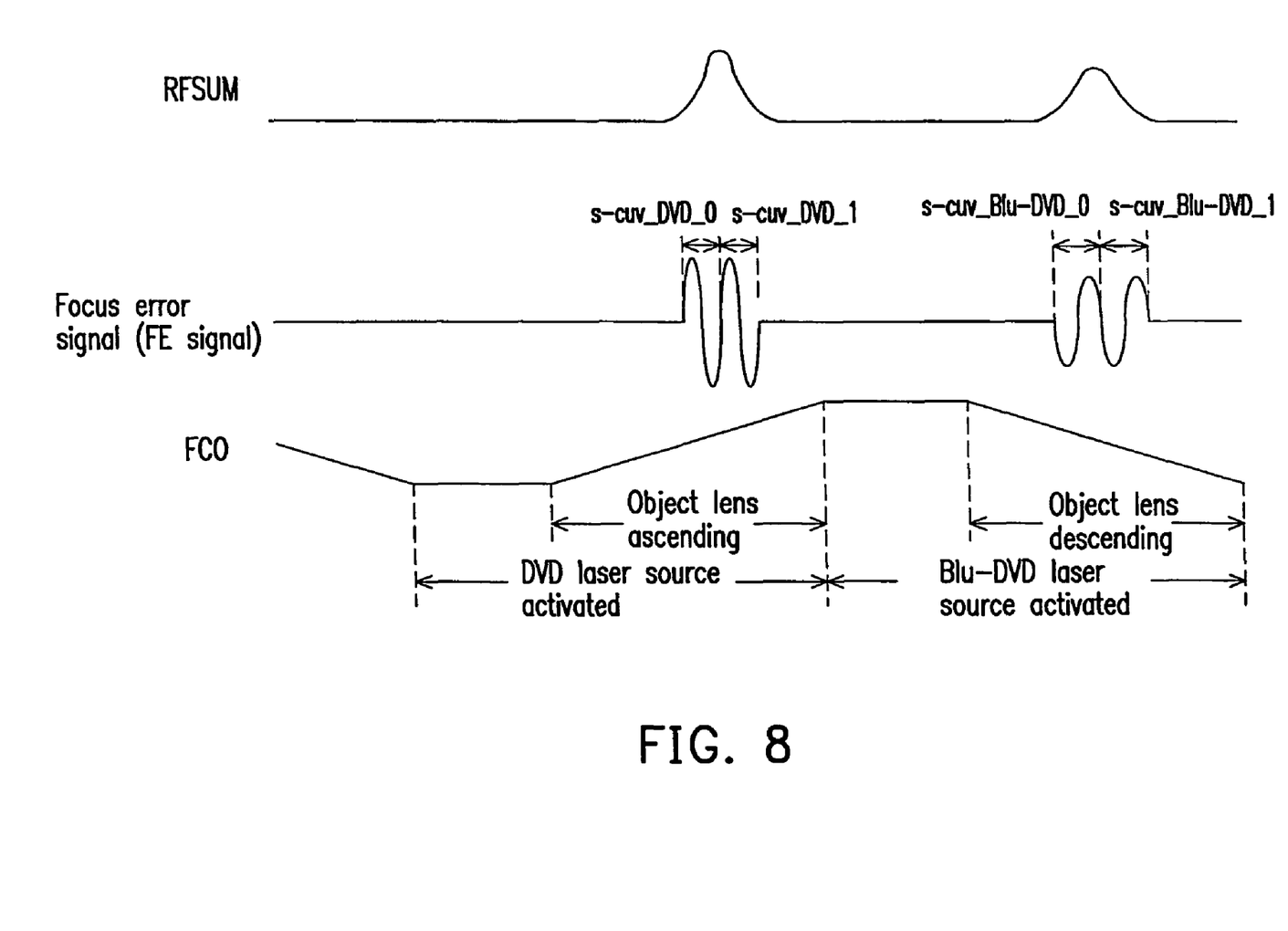
FIG. 8 is a schematic view illustrating an S-curve of an FE signal as an optical disc 23 is a double-layered disc according to the embodiment depicted in FIG. 6.

According to still another embodiment of the present invention, the optical disc may be a multi-layered disc, such as a double-layered disc. In the present embodiment, as the aforesaid lasers are respectively focused on different data layers of the optical disc, the S-curves of a plurality of the FE signals in the different data layers are correspondingly constructed. Here, the comparing unit of the sectional width value of the S-curve records and compares the sectional width values of the S-curves of the FE signals generated in the same data layer. Please refer to FIG. 8 which schematically illustrates the S-curve of the FE signal when the optical disc 23 is the double-layered disc according to the embodiment depicted in FIG. 6. As the DVD laser source 200B is activated, the motor driver 22 is controlled by the control unit 21, such that the voltage of the focus driving voltage signal FCO is increased in a constant slope. Here, the focus actuator 201 controlled by the focus driving voltage signal FCO moves the object lens 202. When the object lens 202 ascends, the DVD laser is focused on a first data layer of the optical disc 23 and a second data layer thereof in sequence, and sectional width values S-cuv_DVD_0 and S-cuv_DVD_1 of the S-curves of the FE signals are then generated. Next, the comparing unit 213 of the sectional width value of the S-curve records the two sectional width values of the two S-curves generated by the DVD laser source 200B. Thereafter, when the Blu-DVD laser source 200C is activated, the motor driver 22 is controlled by the control unit 21, such that the voltage of the focus driving voltage signal FCO is decreased in a constant slope. Here, the focus actuator 201 controlled by the focus driving voltage signal FCO moves the object lens 202. When the object lens 202 descends, the Blu-DVD laser is focused on the first data layer of the optical disc 23 and the second data layer thereof in sequence, and sectional width values S-cuv_Blu-DVD_0 and S-cuv_Blu-DVD_1 of the S-curves of the FE signals are then generated. Next, the comparing unit 213 of the sectional width value of the S-curve records the two sectional width values of the two S-curves generated by the Blu-DVD laser source 200C. Afterwards, the microprocessor 212 controls the comparing unit 213 of the sectional width value of the S-curve to compare the sectional width values S-cuv_Blu-DVD_0 and S-cuv_DVD_0 or compare the sectional width values S-cuv_Blu-DVD_1 and S-cuv_DVD_1 respectively generated by focusing the Blu-DVD laser source 200C and the DVD laser source 200B on the same data layer of the optical disc 23. Namely, the comparing unit 213 of the sectional width value of the S-curve compares S-cuv_DVD_0 with S-cuv_Blu-DVD_0, so as to identify the optical disc 23. Alternatively, the comparing unit 213 of the sectional width value of the S-curve compares S-cuv_DVD_1 with S-cuv_Blu-DVD_1 to identify the optical disc 23. As described hereinbefore, the optical disc 23 is identified based on the laser sources 200A and 200B corresponding to the smallest sectional width value of the S-curve. In the present embodiment, only two laser sources are taken for an example. It is of certainty that other laser sources as provided above can be incorporated in the present invention. Furthermore, the above embodiment is explained with use of the double-layered optical disc. As the optical disc 23 is the multi-layered disc, the optical disc 23 can be identified based on the sectional width values of the S-curves of the FE signals generated by the different laser sources focused on an $i^{th}$ data layer of the optical disc 23.

Figure 9:
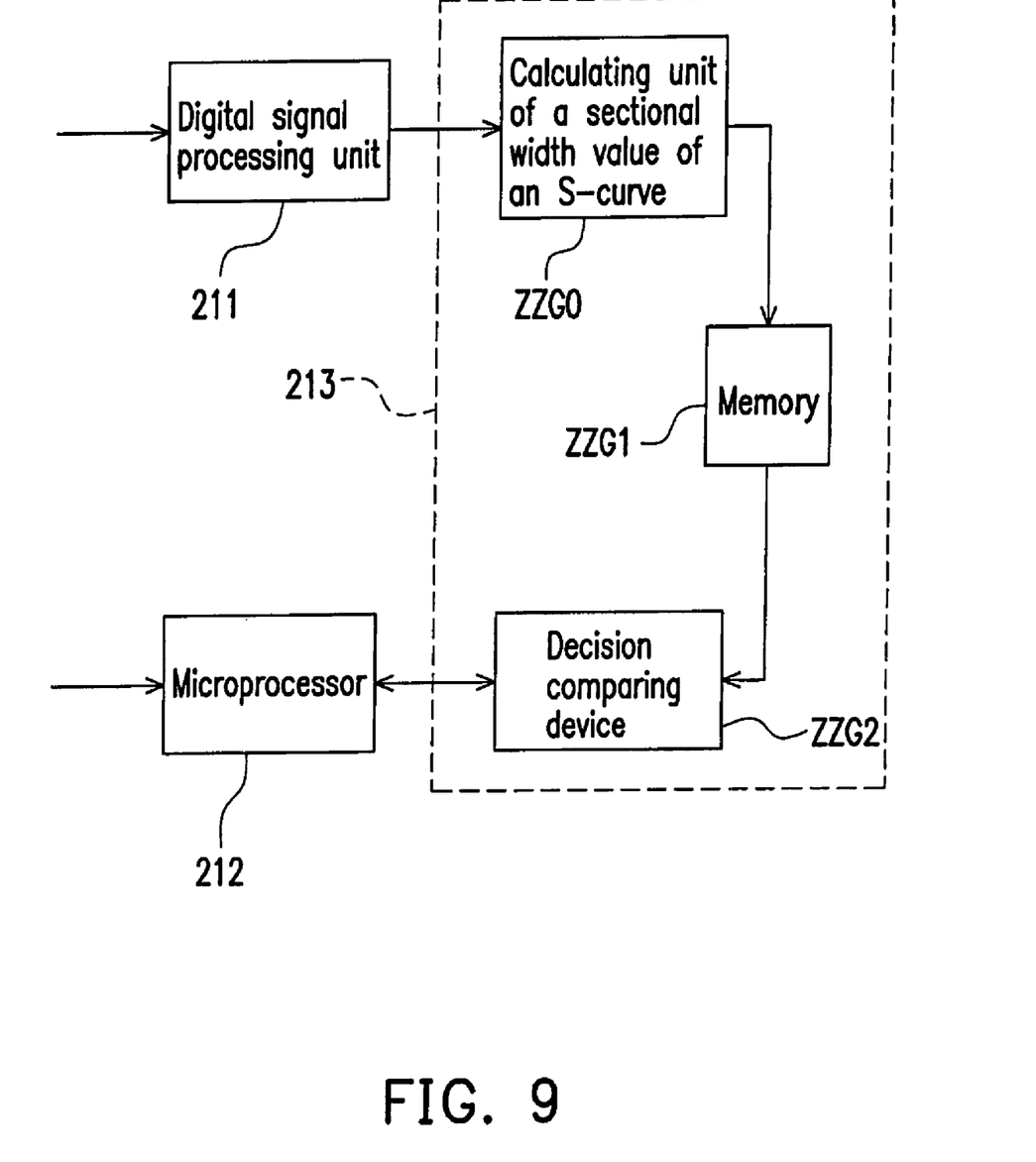
FIG. 9 is a circuit diagram of a comparing unit 213 of a sectional width value of an S-curve.

Next, please refer to FIG. 9 which is a circuit diagram of the comparing unit 213 of the sectional width value of the S-curve. The comparing unit 213 includes a calculator ZZG0 of the sectional width value of the S-curve, a memory ZZG1 and a decision comparing device ZZG2. The calculator ZZG0 is able to obtain the sectional width value of the S-curve based on any sectional width value of the S-curve of the FE signal as the S-curve starts and ends. The sectional width value of the S-curve of the FE signal includes a width value of the positive half of the S-curve, a width value of the negative half of the S-curve, a width value from peak to valley of the S-curve, and so on. Obviously, one skilled in the art may also calculate the sectional width value of the S-curve in other ways. For example, estimating the time difference of any sectional width value of the S-curve also falls within the scope of the claims indicated hereinafter and their equivalents. The memory ZZG1 is coupled to the calculator ZZG0 of the sectional width value of the S-curve for recording the sectional width values of the S-curves. The decision comparing device ZZG2 is coupled to the memory ZZG1. When the sectional width values of the S-curves generated by all the corresponding laser sources are recorded, the decision comparing device ZZG2 compares the sectional width values of all of the S-curves, so as to identify the optical disc 23. The embodiment of the comparing unit 213 of the sectional width value of the S-curve is not intended to limit the present invention, and thus various embodiments in a manner consistent with the scope of the invention may be construed as set forth in the following claims.

The beam splitter 203 may be made of a transparent material coated with a multi-layered film, while the photo detector 204 may be a PIN photodetector or an avalanche photodetector (APD). The embodiment of the beam splitter 203 and the photo detector 204 is not intended to limit the present invention, and thus various embodiments in a manner consistent with the scope of the invention may be construed as set forth in the following claims.

Figure 10:
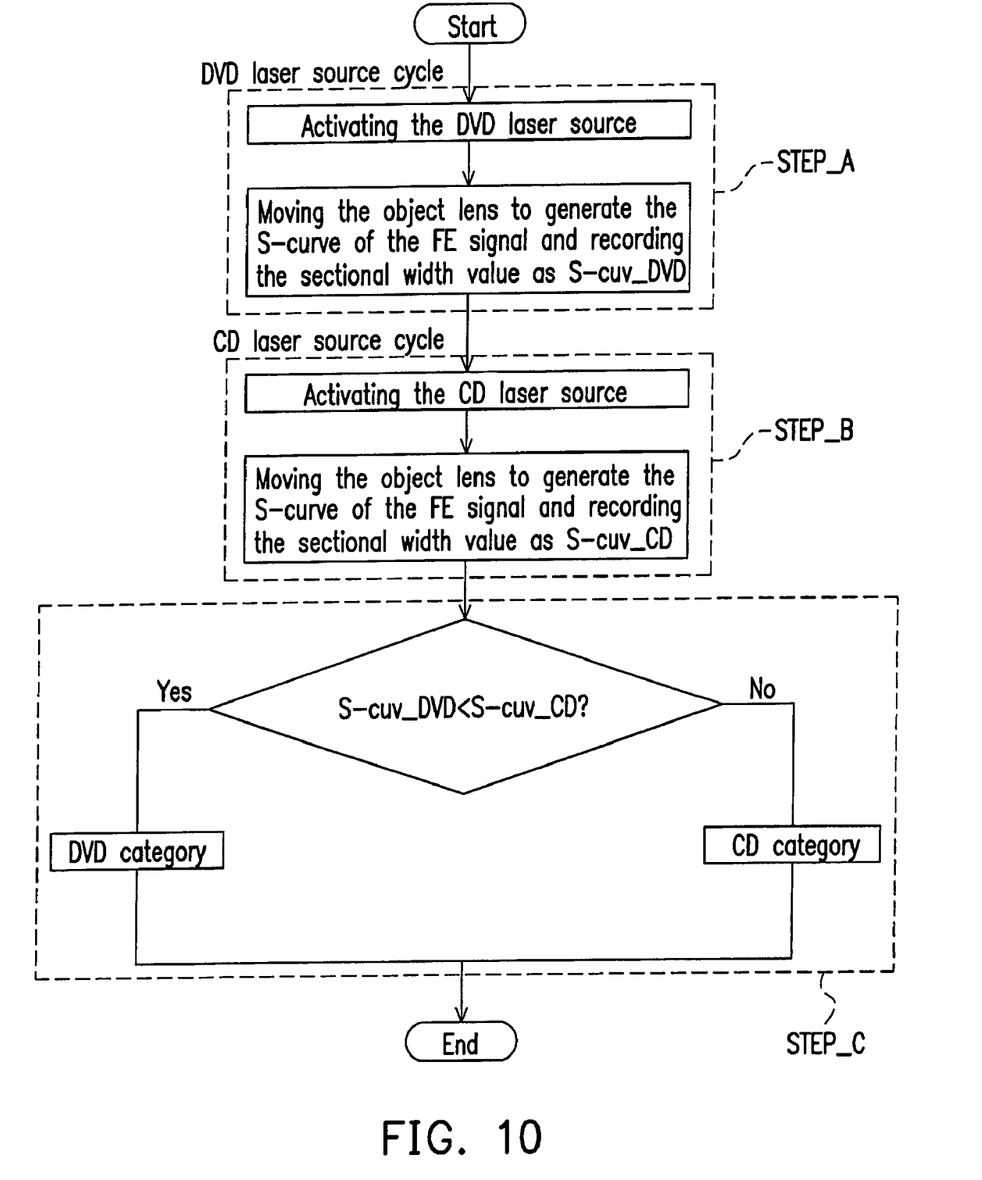
FIG. 10 is a flowchart illustrating a method of identifying an optical disc according to the embodiment of FIG. 4.

Next, please refer to FIG. 10 which is a flowchart illustrating a method of identifying the optical disc according to the embodiment of FIG. 4. As depicted in FIG. 10, the method includes the following steps. In STEP_A, the DVD laser source is activated, the object lens is moved, and the sectional width value S-cuv_DVD of the S-curve generated by the DVD laser source is recorded. In STEP_B, the CD laser source is activated, the object lens is moved, and the sectional width value S-cuv_CD of the S-curve generated by the CD laser source is recorded. In STEP_C, whether S-cuv_DVD is less than S-cuv_CD is determined. If S-cuv_DVD is indeed less than S-cuv_CD, the optical disc is classified into a DVD category. On the contrary, if S-cuv_DVD is not less than S-cuv_CD, the optical disc is classified into a CD category. The order of activating the DVD laser source and the CD laser source is only demonstrated in one of the embodiments. The embodiment is nevertheless not intended to limit the present invention, and thus various embodiments in a manner consistent with the scope of the invention may be construed as set forth in the following claims.

Figure 11:
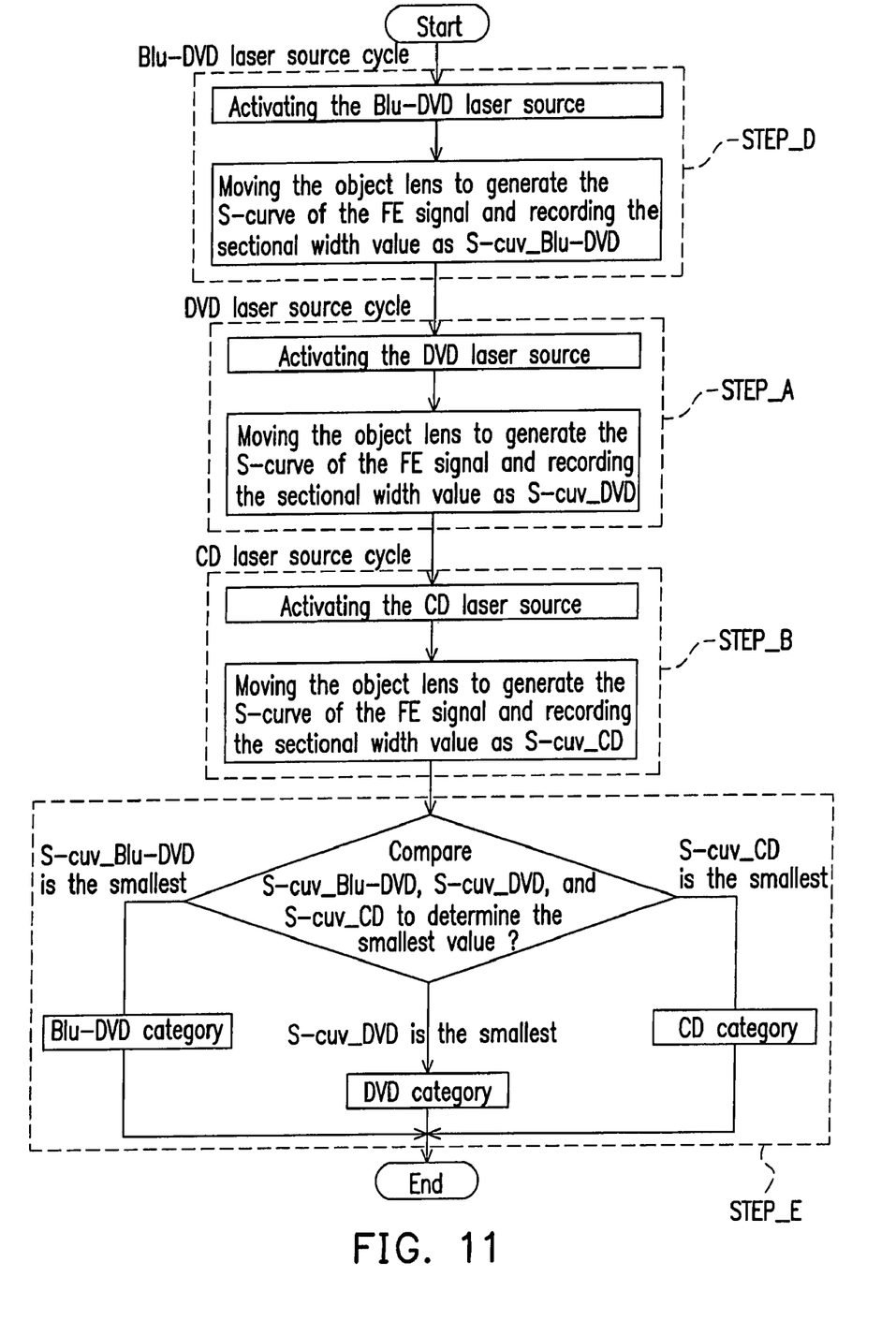
FIG. 11 is a flowchart illustrating a method of identifying an optical disc according to the embodiment of FIG. 6.

Generally, please refer to FIG. 11 which is a flowchart illustrating a method of identifying the optical disc according to the embodiment of FIG. 6. As depicted in FIG. 11, the method includes the following steps. In STEP_D, the Blu-DVD laser source is activated, the object lens is moved, and the sectional width value S-cuv_Blu-DVD of the S-curve generated by the Blu-DVD laser source is recorded. Next, in STEP_A, the DVD laser source is activated, the object lens is moved, and the sectional width value S-cuv_DVD of the S-curve generated by the DVD laser source is recorded. In STEP_B, the CD laser source is activated, the object lens is moved, and the sectional width value S-cuv_CD of the S-curve generated by the CD laser source is recorded. In STEP_E, S-cuv_Blu-DVD, S-cuv_DVD and S-cuv_CD are compared. If S-cuv_Blu-DVD is the smallest, the optical disc is classified into a Blu-DVD category. If S-cuv_DVD holds the smallest value, the optical disc is classified into the DVD category. If S-cuv_CD occupies the smallest value, the optical disc is classified into the CD category. The order of activating the Blu-DVD laser source, the DVD laser source and the CD laser source is merely elaborated in one of the embodiments. The embodiment is nevertheless not intended to limit the present invention, and thus various embodiments in a manner consistent with the scope of the invention may be construed as set forth in the following claims.

In light of the foregoing, the optical disc identification apparatus and the method of identifying the optical disc aimed at discriminating the optical disc by means of the sectional width value of the S-curve of the FE signal. Therefore, unlike the conventional apparatus and method, the apparatus and the method disclosed in the present invention are neither affected by different reflectivity of the optical disc nor influenced by the fabrications of the motor driver and the focus actuator under different variables. As such, the optical disc is not erroneously identified. As a result, the apparatus and the method proposed by the present invention can be adopted to accurately identify the optical discs having substrates in various thicknesses.

The present invention has been disclosed above in the preferred embodiments, but is not limited to those. It is known to persons skilled in the art that some modifications and innovations may be made without departing from the spirit and scope of the present invention. Therefore, the scope of the present invention should be defined by the following claims.

What is claimed is:

1. An optical disc identification apparatus, comprising:
    an optic pickup unit having a plurality of laser sources for emitting any of lasers to the optical disc and detecting the laser reflected from the optical disc to transduce the laser reflected by a data layer of the optical disc to a detection signal; and
    a control unit coupled to the optic pickup unit for controlling the optic pickup unit to activate one of the laser sources and for moving an object lens of the optic pickup unit, wherein the control unit calculates a focus error (FE) signal and thereby obtaining a sectional width value of an S-curve of the FE signal according to the detection signal when the object lens moves, and the control unit repeats above steps to obtain the sectional width values of the S-curves of all the laser sources and compares all the sectional width values, so as to identify the optical disc.

2. The optical disc identification apparatus according to claim 1, wherein the control unit identifies the optical disc based on the laser source corresponding to a smallest sectional width value of the S-curve.

3. The optical disc identification apparatus according to claim 1, wherein the sectional width value of the S-curve comprises one of the sectional width values, a plurality of the sectional width values, half of the sectional width value, a quarter of the sectional width value, a width value of the positive half of the S-curve, a width value of the negative half of the S-curve, a width value from peak to valley of the S-curve, and a combination thereof.

4. The optical disc identification apparatus according to claim 1, wherein the control unit comprises:
    a comparing unit of the sectional width value of the S-curve for recording and comparing the sectional width values of the S-curves, so as to identify the optical disc.

5. The optical disc identification apparatus according to claim 4, wherein the comparing unit of the sectional width value of the S-curve comprises:
    a calculator of the sectional width value of the S-curve for receiving the S-curves and obtaining the sectional width values of the S-curves;
    a memory coupled to the calculator of the sectional width value of the S-curve for recording the sectional width values of the S-curves; and
    a decision comparing device coupled to the memory, wherein the decision comparing device compares the sectional width values of the S-curves when the sectional width values of the S-curves generated by all the corresponding lasers are recorded, so as to identify the optical disc.

6. The optical disc identification apparatus according to claim 4, wherein the control unit further comprises:
    a digital signal processing unit for calculating the FE signal based on the detection signal, so as to obtain the S-curve of the FE signal; and
    a microprocessor coupled to the comparing unit of the sectional width value of the S-curve for controlling a movement of the object lens, controlling the optic pickup unit to activate any of the laser sources, and controlling the comparing unit of the sectional width value of the S-curve to compare the stored sectional width values of the S-curves.

7. The optical disc identification apparatus according to claim 1, wherein the optic pickup unit comprises:
    a photo detector coupled to the control unit for detecting the laser reflected from the optical disc, transducing the reflected laser to the corresponding detection signal, and transmitting the corresponding detection signal to the control unit;
    a beam splitter for transmitting the laser to the object lens and transmitting the reflected laser to the photo detector; and
    a focus actuator for moving the object lens,
    wherein the object lens receives the laser, projects the reflected laser to the beam splitter, and focuses the laser on the data layer of the optical disc.

8. The optical disc identification apparatus according to claim 7, wherein the optic pickup unit further comprises:
    a motor driver coupled to the optic pickup unit and the control unit, wherein the motor driver is controlled by the control unit for driving the focus actuator, such that the focus actuator is able to move the object lens.

9. The optical disc identification apparatus according to claim 1, wherein the plurality of the laser sources comprises:
    a compact disc (CD) laser source controlled by the control unit for emitting a CD laser; and
    a digital video disc (DVD) laser source controlled by the control unit for emitting a DVD laser.

10. The optical disc identification apparatus according to claim 9, wherein the plurality of the laser sources further comprises:
    a Blu-DVD laser source controlled by the control unit for emitting a Blu-DVD laser.

11. The optical disc identification apparatus according to claim 1, wherein when the optical disc is a multi-layered disc, the control unit records the sectional width values of the S-curves of the FE signals generated by focusing the reflected lasers emitted from the laser sources on an $i^{th}$ data layer of the optical disc, and the control unit compares the sectional width values, so as to identify the optical disc.

12. A method of identifying an optical disc, the method being adapted to an apparatus equipped with an optic pickup unit having an object lens and a plurality of laser sources, the method comprising:
    activating one of the laser sources to emit any of lasers to the optical disc;
    moving the object lens;
    detecting the laser reflected by a data layer of the optical disc;
    calculating an FE signal based on the reflected laser and thereby obtaining a sectional width value of an S-curve of the FE signal;
    repeating above steps to obtain the sectional width values of the S-curves corresponding to all of the laser sources; and
    comparing the sectional width values, so as to identify the optical disc.

13. The method of identifying the optical disc according to claim 12, wherein the optical disc is identified based on the laser source having a smallest sectional width value of the S-curve.

14. The method of identifying the optical disc according to claim 12, wherein the sectional width value of the S-curve comprises one of the sectional width values, a plurality of the sectional width values, half of the sectional width value, a quarter of the sectional width value, a width value of the positive half of the S-curve, a width value of the negative half of the S-curve, a width value from peak to valley of the S-curve, and a combination thereof.

15. The method of identifying the optical disc according to claim 12, wherein the step of emitting any of lasers to the optical disc comprises:
   emitting a CD laser from a CD laser cource; and
   emitting a DVD laser from a DVD laser source.

16. The method of identifying the optical disc according to claim 15, wherein step of emitting any of lasers to the optical disc comprises:
   emitting a Blu-DVD laser from a Blu-DVD laser source controlled by the control unit for.

17. The method of identifying the optical disc according to claim 12, wherein when the optical disc is a multi-layered disc, the method further comprises:
   detecting the laser reflected from an $i^{th}$ data layer of the optical disc; and
   comparing the sectional width values of the S-curves of the FE signals generated by focusing the lasers on the $i^{th}$ data layer of the optical disc, so as to identify the optical disc.

18. An optical disc identification apparatus, comprising:
   an optic pickup unit having a first laser source and a second laser source for emitting a first laser and a second laser, respectively;
   a control unit coupled to the optic pickup unit for controlling the optic pickup unit to activate the first and the second laser sources; and
   a comparing unit of the sectional width value of the S-curve, wherein the comparing unit is disposed in the control unit for recording and comparing the sectional width values of the S-curves of a first and a second FE signals generated by focusing the first and the second lasers on a data layer of the optical disc.

19. The optical disc identification apparatus according to claim 18, wherein the comparing unit of the sectional width value of the S-curve identifies the optical disc as a type of the optical disc employing the first laser when the sectional width value of the S-curve of the first FE signal is less than that of the second FE signal, and the comparing unit of the sectional width value of the S-curve identifies the optical disc as a type of the optical disc employing the second laser when the sectional width value of the S-curve of the first FE signal exceeds that of the second FE signal.

20. The optical disc identification apparatus according to claim 18, wherein the sectional width value of the S-curve comprises one of the sectional width values, a plurality of the sectional width values, half of the sectional width value, a quarter of the sectional width value, a width value of the positive half of the S-curve, a width value of the negative half of the S-curve, a width value from peak to valley of the S-curve, and a combination thereof.

21. The optical disc identification apparatus according to claim 18, wherein the comparing unit of the sectional width value of the S-curve comprises:
   a calculator of the sectional width value of the S-curve for receiving the S-curves and obtaining the sectional width values of the S-curves of the first and the second FE signals;
   a memory coupled to the calculator of the sectional width value of the S-curve for recording the sectional width values of the S-curves of the first and the second FE signals;
   a decision comparing device coupled to the memory, wherein the decision comparing device compares the sectional width values of the S-curves when the sectional width values of the S-curves generated by the first and the second laser sources are all recorded, so as to identify the optical disc.

22. The optical disc identification apparatus according to claim 18, wherein the optic pickup unit comprises:
   a photo detector coupled to the control unit for detecting the first and the second lasers reflected by the optical disc, transducing the first and the second reflected lasers to a first and a second detection signals, and transmitting the first and the second detection signals to the control unit;
   a beam splitter for transmitting the first and the second lasers to an object lens and transmitting the first and the second reflected lasers to the photo detector; and
   a focus actuator for moving the object lens, the first and the second lasers being able to be focused on the data layer of the optical disc during the movement of the object lens,
   wherein the object lens receives the first and the second lasers, projects the first and the second reflected lasers to the beam splitter, and focuses the first and the second lasers on the data layer of the optical disc.

23. The optical disc identification apparatus according to claim 22, wherein the control unit further comprises:
   a digital signal processing unit for calculating the first and the second FE signals based on the first and the second detection signals, so as to obtain the sectional width values of the S-curves of the first and the second FE signals; and
   a microprocessor coupled to the comparing unit of the sectional width value of the S-curve for controlling the movement of the object lens, controlling the optic pickup unit to activate the first and the second laser sources, and controlling the comparing unit of the sectional width value of the S-curve to compare the stored sectional width values of the S-curves.

24. The optical disc identification apparatus according to claim 22, the optic pickup unit further comprising:
   a motor driver coupled to the optic pickup unit and the control unit, wherein the motor driver is controlled by the control unit for driving the focus actuator, such that the focus actuator is able to move the object lens.

25. The optical disc identification apparatus according to claim 18, further comprising a third laser source for emitting a third laser, wherein the comparing unit of the sectional width value of the S-curve records the sectional width value of the S-curve of a third FE signal generated by focusing the third laser on the optical disc.

26. The optical disc identification apparatus according to claim 25, wherein the comparing unit of the sectional width value of the S-curve compares the sectional width values of the S-curves of the first, the second and the third FE signals, and the comparing unit identifies the optical disc by detecting the laser source corresponding to a smallest sectional width value of the S-curve.

27. The optical disc identification apparatus according to claim 18, wherein when the optical disc is a multi-layered disc, the control unit records the sectional width values of the S-curves of the first and the second FE signals generated by the first and the second laser source focused on an $i^{th}$ data layer of the optical disc, and the control unit compares the sectional width values, so as to identify the optical disc.

* * * * *